US008291925B2

(12) United States Patent
Gehlhoff et al.

(10) Patent No.: US 8,291,925 B2
(45) Date of Patent: Oct. 23, 2012

(54) METHOD FOR OPERATING A HYDRAULIC ACTUATION POWER SYSTEM EXPERIENCING PRESSURE SENSOR FAULTS

(75) Inventors: Wade L. Gehlhoff, Shakopee, MN (US); Chris W. Schottler, Brooklyn Park, MN (US)

(73) Assignee: Eaton Corporation, Cleveland, OH (US)

( * ) Notice: Subject to any disclaimer, the term of this patent is extended or adjusted under 35 U.S.C. 154(b) by 577 days.

(21) Appl. No.: 12/577,928

(22) Filed: Oct. 13, 2009

(65) Prior Publication Data

US 2011/0083750 A1 Apr. 14, 2011

(51) Int. Cl.
*F16K 31/06* (2006.01)

(52) U.S. Cl. ......... 137/1; 137/106; 137/596.17; 91/454; 91/459; 60/422

(58) Field of Classification Search .............. 137/1, 102, 137/106, 596.17, 118.04, 87.04; 251/26; 91/433, 454, 459; 60/422
See application file for complete search history.

(56) References Cited

U.S. PATENT DOCUMENTS

| | | | | |
|---|---|---|---|---|
| 5,947,140 | A | 9/1999 | Aardema | |
| 5,960,695 | A * | 10/1999 | Aardema et al. | 137/596.17 |
| 6,457,487 | B1 * | 10/2002 | Stephenson et al. | 137/596.17 |
| 6,718,759 | B1 * | 4/2004 | Tabor | 91/459 |
| 6,880,332 | B2 * | 4/2005 | Pfaff et al. | 60/422 |
| 6,951,102 | B2 * | 10/2005 | Tabor | 91/459 |
| 7,059,127 | B2 * | 6/2006 | Bauer et al. | 91/454 |
| 7,100,639 | B2 * | 9/2006 | Rub | 137/596.17 |
| 7,380,398 | B2 * | 6/2008 | Pfaff | 91/454 |
| 7,857,281 | B2 * | 12/2010 | Pfaff | 251/129.04 |
| 8,166,795 | B2 * | 5/2012 | Gehlhoff et al. | 73/1.72 |
| 2007/0227136 | A1 | 10/2007 | Pfaff | |

FOREIGN PATENT DOCUMENTS

| | | | |
|---|---|---|---|
| GB | 2298291 | A | 8/1996 |
| GB | 2439433 | A | 12/2007 |
| GB | 2440810 | A | 2/2008 |

OTHER PUBLICATIONS

PCT Search Report Filed Jan. 18, 2011 for PCT/US2010/052448.

* cited by examiner

*Primary Examiner* — Eric Keasel
(74) *Attorney, Agent, or Firm* — Quinn Law Group, PLLC

(57) ABSTRACT

A method for operating a hydraulic actuation system during a pressure sensor malfunction is provided. The hydraulic actuation system includes a pump, a reservoir, a first work-port and a second work-port, a valve system with individual orifices, a pressure sensor system, and a controller for regulating the hydraulic actuation system based on fluid flow demand and on determined pressure differences. The method includes detecting a malfunction of a pressure sensor for the first work-port, closing second and third orifices, and regulating the pump to generate fluid flow corresponding to maximum pressure generated by the pump. The method also includes assigning a value for the difference between pump pressure and the pressure of the subject work-port that is equivalent to a value within an attainable range for difference between the two pressures. Furthermore, the method includes regulating a first orifice and a fourth orifice in response to the fluid flow demand.

20 Claims, 2 Drawing Sheets

METHOD FOR OPERATING A HYDRAULIC ACTUATION POWER SYSTEM EXPERIENCING PRESSURE SENSOR FAULTS

TECHNICAL FIELD

The present invention relates to hydraulic actuation systems, and, more particularly, to operational modes for hydraulic actuation systems employed in machinery experiencing pressure sensor faults.

BACKGROUND OF THE INVENTION

Hydraulic actuation systems, as employed to operate lifting arms in load transferring equipment, such as construction machinery, typically include a pressure source such as a pump, a fluid tank and at least one fluid cylinder to control a lifting arm of the subject machine.

It is known in the art to utilize pressure sensors for controlling the operation of such hydraulic actuation systems. Typically, the pressure sensors are employed in the control of valves that manage, based on loads, fluid flow between the fluid cylinder, pressure source, and fluid tank. It is, however, conceivable that such a pressure sensor may experience a malfunction, and render the system inoperative.

SUMMARY OF THE INVENTION

A method for operating a hydraulic actuation system during a pressure sensor malfunction is provided. The hydraulic actuation system includes a pressure source, such as a pump, arranged to supply fluid flow in response to a fluid flow demand, a reservoir arranged to hold fluid, and first and second work-ports. The pressure source is in fluid communication with the reservoir and with the first and second work-ports.

The hydraulic actuation system also includes a valve system capable of controlling fluid flow. The valve system has a first orifice arranged between the pressure source and the first pressure chamber, a second orifice arranged between the pressure source and the second pressure chamber, a third orifice arranged between the first pressure chamber and the reservoir, and a fourth orifice arranged between the second pressure chamber and the reservoir.

The hydraulic actuation system also includes a pressure sensor system capable of sensing pressure (Ps) of the fluid supplied by the pressure source, pressure (Pa) of the fluid supplied to the first pressure chamber, and pressure (Pb) of the fluid supplied to the second pressure chamber. The hydraulic actuation system additionally includes a controller arranged to regulate the pressure source and the valve system based on the fluid flow demand and on determined differences between Ps, Pa, Pb, and pressure (Pt) of the fluid returned to the reservoir.

The method includes detecting a malfunction of solely a sensor arranged to sense Pa, closing the second and third orifices, and regulating the pressure source to generate fluid flow corresponding to maximum Ps. The method additionally includes assigning a value for the difference between Ps and Pa that is equivalent to a value within an attainable range for difference between the two pressures. Moreover, regulating the first orifice and the fourth orifice in response to the fluid flow demand is included, such that the system continues to operate despite the malfunction of the sensor arranged to sense Pa.

According to the method, regulating the fourth control valve may be accomplished by generating flow through the fourth orifice that is equivalent to the flow demand multiplied by the ratio between areas of the first and second work-ports. Additionally, a malfunction signal may be generated in response to said detecting a malfunction of the sensor arranged to sense Pa.

The method may further include detecting a malfunction of solely a sensor arranged to sense Pb, closing the second and third orifices, directing the pressure source to generate fluid flow corresponding to Ps>Pa, and assigning a value for the difference between Pb and Pt that is substantially equivalent to a maximum attainable value. In such a case, the method also includes regulating the first orifice in response to fluid flow demand, and regulating the fourth orifice to generate Pb, such that the system continues to operate despite the malfunction of the sensor arranged to sense Pb. Furthermore, regulating the fourth orifice is accomplished by holding Pa below its maximum value. The method may also include generating a malfunction signal in response to said detecting a malfunction of the sensor arranged to sense Pb.

If the reservoir employed within the hydraulic actuation system operates above a minimum known pressure, the pressure sensor system may additionally include a pressure sensor capable of sensing pressure Pt.

The above method may be applied to a machine operated via a hydraulic actuation system. The hydraulic actuation system of the machine employs an actuator having first and second opposing pressure chambers that are arranged to operate an arm of the machine in response to the fluid flow controlled according to the above description.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
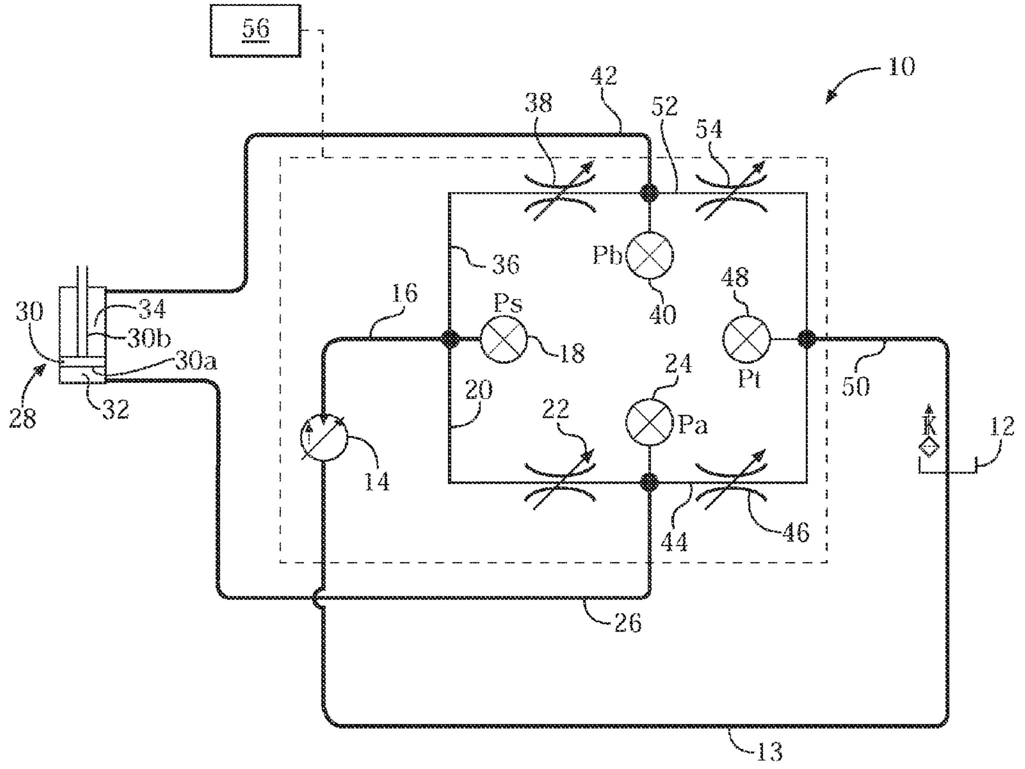
FIG. 1 is a schematic diagram illustrating a hydraulic actuation system employing valves with pressure sensors for controlling system function.

Referring to the drawings wherein like reference numbers correspond to like or similar components throughout the several figures, FIG. 1 illustrates a schematic diagram illustrating a hydraulic actuation system 10 employing a valve system and pressure sensors for controlling system function. Hydraulic actuation system 10 is commonly employed in earth moving or construction machines (not shown) to raise and/or lower the machine's arm in order to transfer a load.

Hydraulic actuation system 10 includes a fluid reservoir 12 in fluid communication with a pressure source, such as a pump 14 via a fluid passage 13. The pressure source 14 is in fluid communication with a first pressure sensor 18 via a fluid passage 16. Sensor 18 is arranged to sense pressure Ps of the fluid supplied by the pressure source 14. The sensor 18 is in fluid communication with an orifice 22 via a fluid passage 20. The orifice 22 is in fluid communication with a second pressure sensor 24. The pressure sensor 24 is arranged to sense pressure Pa of the fluid supplied to a hydraulic actuator 28 via a fluid passage 26.

The hydraulic actuator 28 includes a moveable piston 30 that includes a piston head 30*a* and a rod 30*b*. The piston 30 separates the hydraulic actuator into a first work-port or pressure chamber 32 on the side of the piston head 30*a*, and a second work-port or pressure chamber 34 on the side of the piston rod 30*b*. Specifically, the pressure Pa sensed by the pressure sensor 24 corresponds to pressure of the fluid inside the first pressure chamber 32.

The sensor 18 is additionally in fluid communication with an orifice 38 via a fluid passage 36. The orifice 38 is in fluid communication with a third pressure sensor 40. The pressure sensor 40 is arranged to sense pressure Pb of the fluid supplied to the hydraulic actuator 28 via a fluid passage 42. Specifically, the pressure Pb sensed by the pressure sensor 40 corresponds to pressure of the fluid inside the second pressure chamber 34.

The sensor 24 is also in fluid communication with an orifice 46 via a fluid passage 44. The orifice 46 is in fluid communication with a fourth pressure sensor 48. Pressure sensor 48 is arranged to sense pressure Pt of the fluid returned to the reservoir 12 via a fluid passage 50. The orifice 22 and the orifice 46 may be separate control valves configured to regulate fluid flow between the pressure source 14, the reservoir 12 and the first pressure chamber 32, or be combined into a single control valve structure.

The sensor 40 is also in fluid communication with an orifice 54 via a fluid passage 52. The orifice 54 is in fluid communication with the pressure sensor 48. The orifice 38 and the orifice 54 may be separate control valves configured to regulate fluid flow between the pressure source 14, the reservoir 12 and the second pressure chamber 34, or be combined into a single control valve structure.

Together, the orifices 22, 38, 46 and 54 form a valve system for managing fluid flow through the hydraulic actuation system 10. A controller 56, such as an electronic control unit (ECU), is programmed to regulate the pressure source 14 and the orifices 22, 38, 46 and 54. As understood by those skilled in the art, controller 56 regulates the pressure source 14 and the orifices 22, 38, 46 and 54 based on differences between pressures Ps, Pa, Pb and Pt calculated by the controller, as well as according to the fluid flow demand. The fluid flow demand is generally established by a request from a construction machine's operator, for example, to raise or lower a particular load.

The pressure data sensed and communicated to the controller 56 is additionally employed to determine which of the two chambers 32 and 34 of actuator 28 is subjected to a load. In order to raise a load, hydraulic actuation system 10 is regulated to supply fluid to chamber 32 such that the pressure generated within chamber 32 exceeds the pressure seen by chamber 34. As known by those skilled in the art, the velocity with which a load is to be raised is controlled by the difference in pressure between Pa, Pb, Ps and Pt. It is to be additionally appreciated that when raising a specific load, chamber 32 is required to operate against the force of gravity to handle the load, i.e., the load is "passive", and thus operates an upstream work-port connecting to pressure source 14. In such a situation, chamber 34 operates as a downstream work-port connecting fluid flow to reservoir 12. On the other hand, when lowering a load, the force of gravity assists operation of the chamber 32, i.e., the load is "overrunning", and thus operates as a downstream work-port, while chamber 34 operates as an upstream work-port.

At least one of the pressure sensors, 18, 24, 40 and 48, preferably contains a temperature sensor (not shown) in order to detect temperature of the pressurized fluid and provide such data to the controller 56. Having such temperature data, enables the controller 56 to calculate viscosity of the fluid. As appreciated by those skilled in the art, with fluid viscosity, as well as position of and pressure drop across each particular orifice being known, fluid flow across each orifice may be calculated. The calculated fluid flow across each particular orifice, in combination with communicated flow rate demand, is employed by controller 56 to regulate fluid flow, and thus the pressure Ps provided by the pressure source 14. Operation of the hydraulic actuation system 10 is subject to the maximum fluid flow capacity or capability of the pressure source 14. Therefore, fluid flow to actuator 28, as well as to other actuators in an expanded system, is reduced in order to ensure that the maximum capacity of the pressure source is not exceeded, and the machine operator's request to handle a particular load is satisfied.

Figure 2:
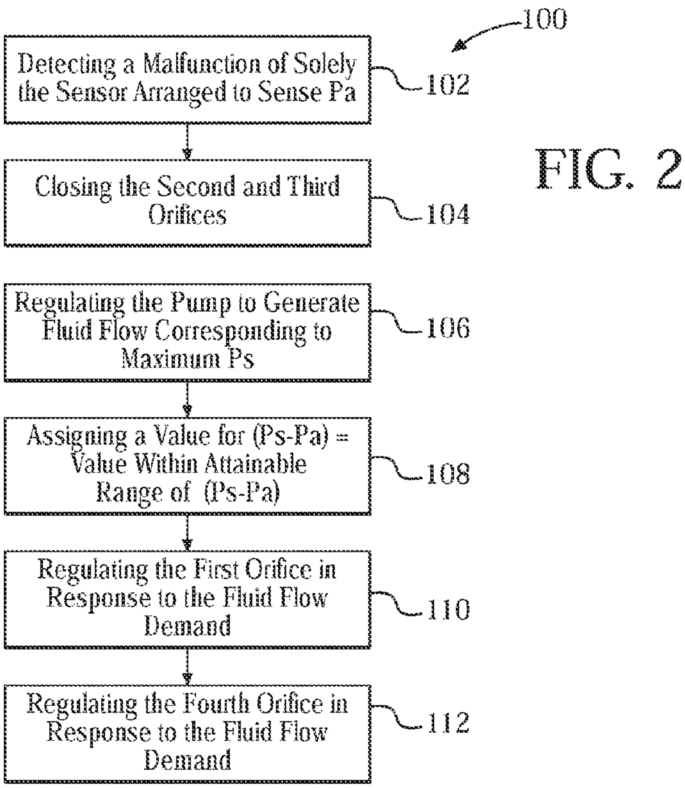
FIG. 2 is a flowchart of a method for controlling a hydraulic actuation system experiencing a second pressure sensor fault.
Figure 3:
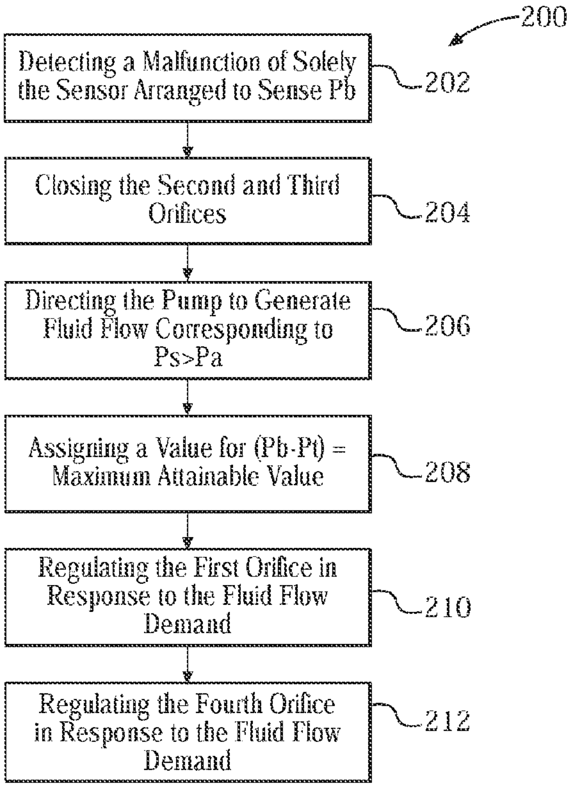
FIG. 3 is a flowchart of a method for controlling a hydraulic actuation system experiencing a third pressure sensor fault.

FIGS. 2 and 3 depict methods 100 and 200, respectively, for operating the hydraulic actuation system 10 in the event either pressure sensor 24 or pressure sensor 40 develops a malfunction. Typically, a loss of data from one of the sensors 24 and 40 results in deactivation of the hydraulic actuation system 10, because with the loss of control via pressure regulation, control over the fluid flow is similarly lost. Additionally, with the loss of such data, the capability to recognize whether the load is passive or overrunning is similarly lost, as is the capability to determine the amount of pressure Ps required to overcome and translate such a load. Methods 100 and 200, on the other hand, by putting both chambers 32 and 34 in flow-control mode, i.e., where fluid flow to both chambers is actively controlled, at a minimum, permit an operator of the machine to complete the job in progress.

Method 100 shown in FIG. 2 commences with a frame 102 where a malfunction of the sensor 24 is detected. The malfunction of sensor 24 is detected by the controller 56 either via registering a loss of pressure signal that is otherwise continuously communicated to the controller, or via registering a signal that is out of the expected range. Following frame 102, the method proceeds to frame 104, where the orifice 38 and orifice 46 are closed. Then, after closing orifices 38 and 46, the method advances to frame 106, where the pressure source 14 is regulated to generate fluid flow corresponding to maximum Ps. Maximum Ps is a maximum pressure that the pressure source 14 is capable of providing.

From frame 106, the method advances to frame 108, where the difference between Ps and Pa, i.e., (Ps−Pa), is set to a value that is equivalent to a value within an attainable range for difference between the two pressures. The set value of (Ps−Pa) is assumed and assigned in place of an unknown value for (Ps−Pa) for use by the controller 56. The set value of (Ps−Pa) is chosen based on a recognition that, although likely not the actual value for (Ps−Pa), the chosen value enables the controller 56 to continue to regulate the hydraulic actuation system 10. The (Ps−Pa) value may be set to a mean value or midpoint of the attainable range for the subject difference, as a default. Following frame 108, the method proceeds to frame 110.

In frame 110, orifice 22 is regulated by controller 56 in response to the fluid flow demand, as directed by the operator of the machine. After frame 110, the method advances to frame 112, where the orifice 54 is regulated by the controller 56 to generate flow through the fourth orifice that is equivalent to the flow demand offset by the ratio between areas of the first and second chambers 32 and 34. In other words, the flow at orifice 54 is set to flow demand multiplied by the ratio between areas of the first and second chambers 32 and 34. The ratio between areas of chambers 32 and 34 is a known fixed quantity. As a result of implementation of method 100, in spite of the malfunction of sensor 24, the hydraulic actuation system 10 is controlled to operate actuator 28 and support a load or extend an arm of the construction machine.

Method 200 shown in FIG. 3 commences with frame 202, where a malfunction of the sensor 40 is detected. Similar to the malfunction of sensor 24 above, the malfunction of sensor 40 is detected by the controller 56 either via registering a loss of pressure signal that is otherwise continuously communicated to the controller, or via registering a signal that is out of the expected range. Following frame 202, the method proceeds to frame 204, where the orifice 38 and 46 are closed. After closing orifices 38 and 46, the method advances to frame 206.

In frame 206, the pressure source 14 is regulated to generate fluid flow corresponding to Ps>Pa, i.e., such that the fluid pressure generated by pressure source 14 is greater than the pressure seen at sensor 24. Setting pressure of the pressure source 14 to greater than the pressure seen at sensor 24 permits to ensure that the pressure generated by the pressure source 14 will be sufficient to support a load at the first pressure chamber 32. From frame 206, the method advances to frame 208.

In frame 208, a value for the difference between Pb and Pt, i.e., (Pb−Pt), is set to a maximum attainable value for the subject difference. The maximum value of (Pb−Pt) is assumed and programmed into the controller 56. The maximum value of (Pb−Pt) is chosen based on a recognition that, although likely not the actual value for (Pb−Pt), the chosen value enables the controller 56 to continue to regulate the hydraulic actuation system 10. Following frame 208, the method proceeds to frame 210.

In frame 210, orifice 22 is regulated by controller 56 in response to the fluid flow demand, as directed by the operator of the construction machine. After frame 210, the method advances to frame 212, where the orifice 54 is regulated by the controller 56 to keep Pa at or below its maximum allowable pressure. Thus, the method 200 employs the control of pressure Pa to regulate the pressure within the chamber 34, in what is termed as "cross-axis" control. As a result of implementation of method 200, and similar to method 100 described above, in spite of the malfunction of sensor 40, the hydraulic actuation system 10 is controlled to operate actuator 28 and support a load or extend an arm of the construction machine.

Because methods 100 and 200 are enabled by assigning assumed pressure differences for controlling the hydraulic actuation system 10, the respective pressures generated in pressure chambers 32 and 34 are not matched precisely to the handled load. As a result of employing assumed values to control the operation of hydraulic actuation system 10, the amount of movement of piston 32 within the actuator 28 and the velocity with which the piston translates may differ somewhat from the expected outcome. Such loss of precision typically results in a reduction of the hydraulic actuation system's operating efficiency. Operation with reduced efficiency nonetheless maintains the functionality of the construction machine, and permits the machine to complete a prescribed task despite experiencing a pressure sensor malfunction.

While maintaining operation of the hydraulic actuation system 10 despite a malfunction of either the pressure sensor 24 or the pressure sensor 40, both methods 100 and 200 may provide for a generation of a malfunction signal to the machine's operator. Such a malfunction signal may be displayed as a visual and/or an audible alert, preferably on an instrument panel of the subject machine.

While the best modes for carrying out the invention have been described in detail, those familiar with the art to which this invention relates will recognize various alternative designs and embodiments for practicing the invention within the scope of the appended claims.

The invention claimed is:

1. A method for operating a hydraulic actuation system during a pressure sensor malfunction, the hydraulic actuation system including:

a pressure source arranged to supply fluid flow in response to a fluid flow demand, a reservoir arranged to hold fluid, a first work-port and a second work-port, wherein the pressure source is in fluid communication with the reservoir and the first and second work-ports; a valve system capable of controlling fluid flow having a first orifice arranged between the pressure source and the first work-port, a second orifice arranged between the pressure source and the second work-port, a third orifice arranged between the first work-port and the reservoir, and a fourth orifice arranged between the second work-port and the reservoir; a pressure sensor system capable of sensing pressure (Ps) of the fluid supplied by the pressure source, pressure (Pa) of the fluid supplied to the first work-port, and pressure (Pb) of the fluid supplied to the second work-port; and a controller arranged to regulate the pressure source and the valve system based on the fluid flow demand and on determined differences between Ps, Pa, Pb, and pressure (Pt) of the fluid returned to the reservoir;

the method comprising:

detecting a malfunction of solely a sensor arranged to sense Pa;

closing the second and third orifices;

regulating the pressure source to generate fluid flow corresponding to a maximum Ps;

assigning a value for the difference between Ps and Pa that is equivalent to a value within an attainable range for the difference between Ps and Pa;

regulating the first orifice in response to the fluid flow demand; and regulating the fourth orifice in response to the fluid flow demand, such that the system continues to operate despite the malfunction of the sensor arranged to sense Pa.

2. The method according to claim 1, wherein said regulating the fourth orifice is accomplished by generating flow through the fourth orifice that is equivalent to the flow demand multiplied by the ratio between areas of the first and second work-ports.

3. The method according to claim 1, further comprising generating a malfunction signal in response to said detecting a malfunction of the sensor arranged to sense Pa.

4. The method according to claim 1, further comprising:

detecting a malfunction of solely a sensor arranged to sense Pb;

closing the second and third orifices;

directing the pressure source to generate fluid flow corresponding to Ps>Pa;

assigning a value for a difference between Pb and Pt that is substantially equivalent to a maximum attainable value for the difference;

regulating the first orifice in response to the fluid flow demand; and regulating the fourth orifice in response to the fluid flow demand, such that the system continues to operate despite the malfunction of the sensor arranged to sense Pb.

5. The method according to claim 4, wherein said regulating the fourth orifice is accomplished by holding Pa at or below its maximum value.

6. The method according to claim 4, further comprising generating a malfunction signal in response to said detecting a malfunction of the sensor arranged to sense Pb.

7. The method according to claim 1, wherein the pressure sensor system further comprises a pressure sensor capable of sensing pressure Pt.

8. A method for operating a machine controlled by a hydraulic actuation system during a pressure sensor malfunction, the hydraulic actuation system including:

a pressure source arranged to supply fluid flow in response to a fluid flow demand, a reservoir arranged to hold fluid, an actuator having first and second opposing pressure chambers arranged to operate an arm of the construction machine in response to the fluid flow, wherein the pressure source is in fluid communication with the reservoir and the actuator; a valve system capable of controlling fluid into and out of the actuator having a first orifice arranged between the pressure source and the first pressure chamber, a second orifice arranged between the pressure source and the second pressure chamber, a third orifice arranged between the first pressure chamber and the reservoir, and a fourth orifice arranged between the second pressure chamber and the reservoir; a pressure sensor system capable of sensing pressure (Ps) of the fluid supplied by the pressure source, pressure (Pa) of the fluid supplied to the first pressure chamber, and pressure (Pb) of the fluid supplied to the second work-port; and a controller arranged to regulate the pressure source and the valve system based on the fluid flow demand and on determined differences between Ps, Pa, Pb, and pressure (Pt) of the fluid returned to the reservoir;

the method comprising:

detecting a malfunction of solely a sensor arranged to sense Pa;

closing the second and third orifices;

regulating the pressure source to generate fluid flow corresponding to a maximum Ps;

assigning a value for the difference between Ps and Pa that is equivalent to a value within an attainable range for the difference between Ps and Pa;

regulating the first orifice in response to the fluid flow demand; and regulating the fourth orifice in response to the fluid flow demand, such that the machine continues to operate despite the malfunction of the sensor arranged to sense Pa.

9. The method according to claim 8, wherein said regulating the fourth orifice is accomplished by generating flow through the fourth orifice that is equivalent to the flow demand multiplied by the ratio between areas of the first and second work-ports.

10. The method according to claim 8, further comprising generating a malfunction signal in response to said detecting a malfunction of the sensor arranged to sense Pa.

11. The method according to claim 8, further comprising:

detecting a malfunction of solely the sensor arranged to sense Pb;

closing the second and third orifices;

directing the pressure source to generate fluid flow corresponding to Ps>Pa;

assigning a value for a difference between Pb and Pt that is substantially equivalent to a maximum attainable value for the difference;

regulating the first orifice in response to the fluid flow demand; and regulating the fourth orifice in response to the fluid flow demand, such that the system continues to operate despite the malfunction of the sensor arranged to sense Pb.

12. The method according to claim 11, wherein said regulating the fourth orifice is accomplished by holding Pa at or below its maximum value.

13. The method according to claim 11, further comprising generating a malfunction signal in response to said detecting a malfunction of the sensor arranged to sense Pb.

14. The method according to claim 8, wherein the pressure sensor system further comprises a pressure sensor capable of sensing pressure Pt.

15. A system for operating a hydraulic actuation system during a pressure sensor malfunction, the system including:

a pressure source arranged to supply fluid flow in response to a fluid flow demand, a reservoir arranged to hold fluid, a first work-port and a second work-port, wherein the pressure source is in fluid communication with the reservoir and the first and second work-ports; a valve system capable of controlling fluid flow having a first orifice arranged between the pressure source and the first work-port, a second orifice arranged between the pressure source and the second work-port, a third orifice arranged between the first work-port and the reservoir, and a fourth orifice arranged between the second work-port and the reservoir; a pressure sensor system capable of sensing pressure (Ps) of the fluid supplied by the pressure source, pressure (Pa) of the fluid supplied to the first work-port, pressure (Pb) of the fluid supplied to the second work-port, and pressure (Pt) of the fluid returned to the reservoir; and a controller arranged to regulate the pressure source and the valve system based on the fluid flow demand and on determined differences between Ps, Pa, Pb, and Pt;

the controller adapted for:

detecting a malfunction of solely a sensor arranged to sense Pa;

closing the second and third orifices;

regulating the pressure source to generate fluid flow corresponding to a maximum Ps;

assigning a value for the difference between Ps and Pa that is equivalent to a value within an attainable range for the difference between Ps and Pa;

regulating the first orifice in response to the fluid flow demand; and regulating the fourth orifice in response to the fluid flow demand, such that the system continues to operate despite the malfunction of the sensor arranged to sense Pa.

16. The system according to claim 15, wherein said regulating the fourth orifice is accomplished by generating flow through the fourth orifice that is equivalent to the flow demand multiplied by the ratio between areas of the first and second work-ports.

17. The system according to claim 15, wherein the controller is further adapted for generating a malfunction signal in response to said detecting a malfunction of the sensor arranged to sense Pa.

18. The system according to claim 15, wherein the controller is further adapted for:

detecting a malfunction of solely a sensor arranged to sense Pb;

closing the second and third orifices;

directing the pressure source to generate fluid flow corresponding to Ps>Pa;

assigning a value for a difference between Pb and Pt that is substantially equivalent to a maximum attainable value for the difference;

regulating the first orifice in response to the fluid flow demand; and regulating the fourth orifice in response to the fluid flow demand, such that the system continues to operate despite the malfunction of the sensor arranged to sense Pb.

19. The system according to claim 18, wherein said regulating the fourth orifice is accomplished by holding Pa at or below its maximum value.

20. The system according to claim 18, wherein the controller is further adapted for generating a malfunction signal in response to said detecting a malfunction of the sensor arranged to sense Pb.

* * * * *